United States Patent [19]

Britton et al.

[11] Patent Number: 4,736,763

[45] Date of Patent: Apr. 12, 1988

[54] AUTOMATIC DEVICE FOR THE DETECTION AND SHUTOFF OF UNWANTED LIQUID FLOW IN PIPES

[76] Inventors: George L. Britton, 662 Omar Cir., Yellow Springs, Ohio 45387; David A. Ratino, 2939 Nance St., Mesa, Ariz. 85203; Alfred W. Peterman, 615 Groton Ct., Apt. B, Dayton, Ohio 45431

[21] Appl. No.: 19,265

[22] Filed: Feb. 26, 1987

[51] Int. Cl.⁴ ............................................... G01M 3/08
[52] U.S. Cl. .................................... 137/10; 137/460; 137/487.5; 73/40.5 R; 73/3; 73/861.18; 73/592
[58] Field of Search ...................... 137/487.5, 460, 486, 137/1, 2; 73/3, 592, 861.18, 40.5 R, 40.5 A

[56] References Cited

U.S. PATENT DOCUMENTS

| | | | |
|---|---|---|---|
| 3,580,092 | 5/1971 | Scarpe | 73/194 |
| 3,821,726 | 6/1974 | Chang et al. | 340/239 R |
| 4,188,971 | 2/1980 | Otteson | 137/460 |
| 4,230,187 | 10/1980 | Seto et al. | 166/362 |
| 4,324,268 | 4/1982 | Jacobson | 137/312 |
| 4,355,654 | 10/1982 | Levesque et al. | 137/110 |
| 4,570,489 | 2/1986 | Baumaire | 73/40.5 A |

*Primary Examiner*—Alan Cohan
*Attorney, Agent, or Firm*—Donald J. Singer; Fredric L. Sinder

[57] ABSTRACT

A pipe flow detector for activating a solenoid to automatically close a pipe shutoff valve in the event of a leak. The detector comprises a piezoelectric film transducer attached to the pipe, the transducer producing a fluctuating electrical signal in response to pipe vibration. An amplifier amplifies the signal, which is then passed to a tunable low-pass filter. The output from the filter is passed to an averaging circuit to produce an electrical signal representative of the total voltage changes of the fluctuating electrical signals. An LED is connected to the output of the averaging circuit to provide a means to tune the filter. The filter may be tuned by: (a) providing a pipe flow substantially equal to the pipe flow that would occur in the presence of a leak and tuning the filter to provide the brightest output of the LED; (b) starting and stopping pipe flow and tuning the filter to a point where an output of the LED is generally present only in the presence of a flow; or, (c) externally causing a starting and stopping pipe vibration and tuning the filter to a point where the LED generally does not become brighter in response to the externally caused pipe vibration. During unattended operation, the averaging circuit output is passed through an RC timing circuit that passes the averaging circuit output after a preselected period of time. A latchable level detector receives the timing means output and, when a high enough signal level is received, sends a signal to a solenoid driver which drives the solenoid.

3 Claims, 1 Drawing Sheet

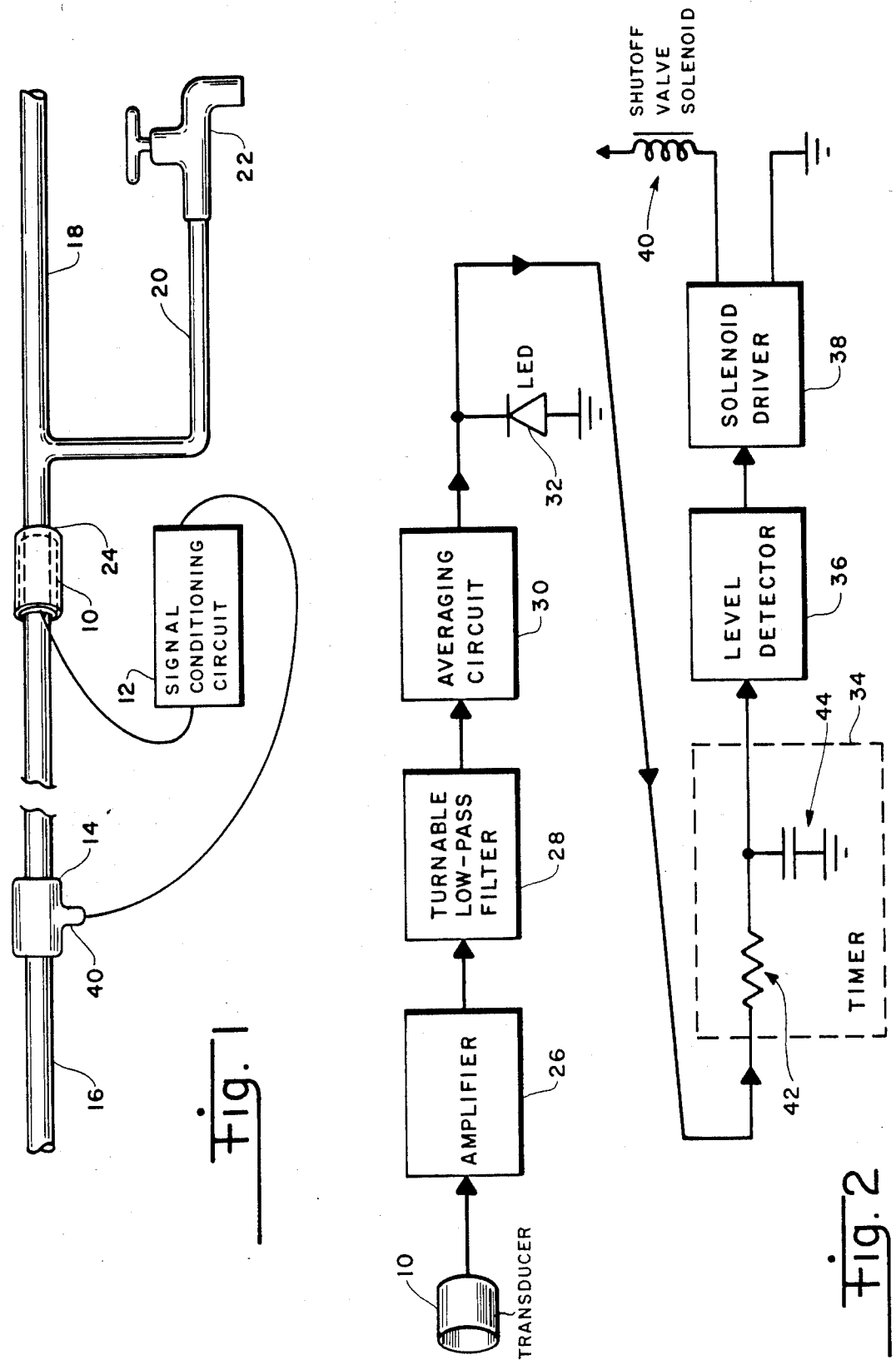

AUTOMATIC DEVICE FOR THE DETECTION AND SHUTOFF OF UNWANTED LIQUID FLOW IN PIPES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to apparatus for automatically shutting off unwanted fluid flow in pipes, and more specifically to a novel combination piezoelectric film transducer and signal conditioning circuitry.

Damage to buildings and equipment from water pipes cracking or breaking during unattended periods such as evenings and weekends is a well-known problem. The problem is made worse in the case of pipes carrying chemicals such as flammable and corrosives. The damage can be avoided or greatly reduced if immediate corrective action is taken to stop the fluid flow.

Prior art appratus to solve this problem generally use leakage detectors to automatically trigger flow shutoff valves. Prior art leakage detectors generally work either by detecting the presence of fluid outside the pipe, or by detecting the presence of a flow, or an unusual flow rate, at a distance from the damaged area of pipe.

Prior art detectors that detect the presence of fluid outside a pipe generally do not provide a trigger signal sufficient to activate a flow shutoff valve until after a substantial amount of fluid has leaked and damage already occurred.

Prior art detectors which detect abnormal flow rates at locations away from the pipe sections where leakage may occur are generally elaborate flow measuring devices placed inside the pipes. Their complexity prevents distributing reasonable numbers of such devices over a large facility and makes their use as a retrofit in an existing facility extremely difficult. An improvement is piezoelectric crystal transducers which can be placed on the outside of pipes to detect vibrations resulting from the flow of fluid within the pipe. These piezoelectric crystal transducers respond generally to ultrasonic frequencies and require accompanying circuitry to amplify, condition and distinguish their electrical output to identify when appropriate vibration is present and to trigger shutoff valves. The circuitry is in many cases overly complex and subject to both failure to detect leaks and to false alarms.

It is, therefore, a principal object of the present invention to provide an improved flow detector using a piezoelectric transducer and simple circuitry that provide an accurate trigger signal identifying unwanted fluid flow in a pipe and which will activate a shutoff valve.

It is another object of the present invention to provide piezoelectric transducer circuitry that is easily tuned for different conditions and pipes.

It is yet another object of the present invention to provide piezoelectric transducer circuitry that avoids false and spurious signals.

A feature of the present invention is that it is non-invasive and may be easily retro-fitted to existing installations.

SUMMARY OF THE INVENTION

The present invention provides an apparatus and method for detecting unwanted fluid flow in pipes and triggering an automatic valve shutoff. The unique discovery of the present invention is that a piezoelectric film transducer combined with signal conditioning circuitry which includes a tunable low-pass filter and a simple output level indicator, such as an LED, provides a flow detector with increased sensitivity and with the ability to be pre-tuned to maximize detector sensitivity and selectivity. The new flow detector responds to low frequency vibrations instead of the ultrasonic vibrations of the prior art. The addition of noise deadening material surrounding the tranducer further improves system performance.

Accordingly, the present invention is directed to a pipe flow detector for activating a solenoid to automatically close a pipe shutoff valve when there is a leak. The detector comprises a piezoelectric film transducer attached to the pipe, the transducer producing a fluctuating electrical signal in response to pipe vibration. An amplifier amplifies the signal, which is then passed to a tunable low-pass filter. The output from the tunable low-pass filter is passed to an averaging circuit to produce an electrical signal representative of the total voltage changes of the fluctuating electrical signals. Signal level measuring means are connected to the output of the averaging circuit to provide a means to tune the filter. The filter is tuned by: (a) providing a pipe flow substantially equal to the pipe flow that would occur in the presence of a leak and tuning the filter to provide the brightest output of the LED: (b) starting and stopping pipe flow and tuning the filter to a point where an output of the LED is generally present only in the presence of a flow; or, (c) externally causing a starting and stopping pipe vibration and tuning the filter to a point where the LED generally does not become brighter in response to the externally caused pipe vibration. During unattended operation, the averaging circuit output is passed through a timing circuit that passes the averaging circuit output after a preselected period of time. A latchable level detector receives the timing means output and, when a high enough signal level is received, sends a signal to a solenoid driver which drives the solenoid.

The measuring means may comprise a light emitting diode and, the timing means may comprise an RC circuit.

DESCRIPTION OF THE DRAWINGS

The present invention will be more clearly understood from a reading of the following detailed description in conjunction with the accompanying drawings wherein:

FIG. 1 is a representation view of a pipe system showing the attachment of a piezoelectric film transducer and signal conditioning circuitry connected to a shutoff valve; and, FIG. 2 is a block diagram of the signal conditioning circuit for the piezoelectric film transducer vibration detector.

DETAILED DESCRIPTION

Referring now to FIG. 1 of the drawings, there is shown a representational view of a pipe system showing the attachment of a piezoelectric film transducer 10 and signal conditioning circuitry 12 connected to a shutoff valve 14. The pipe system shown is representative and typically will comprise a great variety of interconnected pipes connecting a relatively few main supplies of fluids, such as a water or gas main, with a large number of intermediate pipes connected to a very large number of smaller pipes leading to final fluid outlets. In FIG. 1, pipe section 16 represents an intermediate pipe connected to intermediate pipe section 18 which feeds smaller pipe 20 connected to outlet 22. Outlet 22 may be a spigot as shown, or may be a connection to any piece of equipment requiring a supply of fluid. The piezoelectric film of transducer 10 is a thin clear plastic film made to have piezoelectric properties by the deposition of piezoelectric material on both sides of the film. The film has a positive and a negative side and will produce a charge in response to either compression or stretch of the film. The film is available from Pennwalt Corporation under the tradename Kynar TM. Piezoelectric film transducer 10 is attached to pipe 18 by tightly wrapping a long rectangular strip of the film around pipe 18 and taping in place. Sound deadening material 24 is wrapped around transducer 10 to substantially cover it and reduce the effect of ambient noise.

To reduce the number of transducers required, transducers 10 will typically be wrapped around intermediate pipes as shown, and not near each outlet. A leak or break in any one of smaller pipes, such as pipe 20, fed by intermediate pipe 18 will cause piezoelectric film transducer 10 and accompanying circuitry 12 to trigger shutoff valve 14. Specific transducers 10 may be required to protect critical areas or areas particularly subject to leakage.

FIG. 2 is a block diagram of the signal conditioning circuit 12 for the detector. Circuit 12 comprises an amplifier 26, a tunable low-pass filter 28, an averaging circuit 30, a light emitting diode (LED) 32, a timing circuit 34, a level detector 36, and a solenoid driver 38. Solenoid driver 38 drives solenoid 40 of a shutoff valve 14. During unattained periods, a leak through outlet 22, or a break in pipe 20, will cause an increase over the normal flow of fluid through pipe 18. The flow will increase vibrations of pipe 18. The vibrations are transmitted through the pipe to piezoelectric film transducer 10, which creates in response a fluctuating electrical signal voltage. As the voltage is very small, it must first be amplified by amplifier 26 to make a signal of sufficient amplitude to be acted upon by the other elements of circuit 12. The signal is then passed through tunable low-pass filter 28 which may be tuned to pass only a selected narrow band of frequencies. Tunable filter 28 is preferably designed to pass signals generally in the range of 0 to 500 Hz. Selection of a particular bandwidth of frequencies within that range by tuning is described by example later. The filtered fluctuating signal is averaged by averaging circuit 30 to provide a voltage level signal more susceptible to detection. Averaging circuit 30 may comprise a mean average deviation circuit, a root mean square (rms) circuit, or other similar circuit suitable for converting a varying signal into a voltage level indicating the strength of the varying signal. LED 32 is connected between the output of averaging circuit 30 and ground. Its brightness will vary with the signal strength of the output of averaging circuit 30. The output of averaging circuit 30 is additionally connected to timer 34. Timer 34 comprises, in this embodiment, an RC circuit of resistor 42 and capacitor 44. The time delay of the RC circuit, the time required to sufficiently charge capacitor 42 to permit a significant portion of the output of averaging circuit 30 to pass, is set to eliminate false alarms from transient and spurious signals. Level detector 36, when a signal above a preselected level indicating abnormal flow is received from timer 34, will send a trigger signal to solenoid driver 38 to begin to drive solenoid 40. Level detector 36 is latchable so that when tripped, it will latch in the on position to hold the shutoff valve closed until a manual determination can be made to allow the valve to re-open.

The use of the detector and the increased selectivity provided by its novel tuning capability will be best demonstrated by the following example. Transducer 10 and signal conditioning circuit 12 is attached to a pipe system as previously described. The purpose is to detect unusual flow rates during evenings or other unoccupied periods. Since in any large pipe system, some flow always exist, such as from leaking spigots or toilets, the detector must be able to distinguish not merely flow from no flow, but an unusually high flow from a normal flow. While individual pipe sections of pipe systems located inside a building tend to vibrate at the same specific resonant frequencies, whether caused by fluid flow inside the pipe section, fluid flow inside other pipe sections, traffic vibration outside the building, or any other cause, tests have shown that the presence, or non-presence, of at least some frequencies is dependent upon liquid flow inside the pipe section. In one test, for example, a pipe section began vibrations at frequencies below 180 Hz only after flow began, while vibrations at about 260 Hz disappeared after flow began. Once flow begins, there is no change in frequency spectrum with changes in flow rates, only changes in amplitude. Since some flow always exists, in most cases it is sufficient to allow low-pass filter 28 to pass all frequencies between substantially 0-500 Hz and to set level detector 36 to trigger at a signal level representing the increased flow amplitude caused by an abnormal leak. That signal level is determined simply by introducing in the pipe a flow substantially equal to the flow that is expected to exist in the presence of a leak. While level detector 36 may alternatively be set at a level just above the normal flow vibration amplitude, in situations where high ambient vibration levels exist, a greater number of false alarms may occur. In those situations, the ability to tune filter 28 to a specific narrow band of frequencies provides increased selectivity and rejection of spurious signals. Tuning may be accomplished in several ways, in each case without the requirement of sophisticated spectrum analysis equipment. For example, fluid flow may be alternatively started and stopped in the pipe while filter 28 is tuned across its range. The relative brightness of LED 32 is observed to find a setting where LED 32 is dark when the flow is off and lit when the flow is on. By thus tuning the system, the effect of ambient vibrations caused by flow in other pipe sections, etc. may be substantially eliminated. According to a second method, ambient vibration is introduced in the presence of fluid flow by striking the pipe or structures near to it while filter 28 is tuned across its bandwidth. The relative brightness of LED 32 is again observed to find a setting where the brightness does not gererally increase in response to the increased incident vibration. This setting should correspond generally to the setting found by the first method. By having both methods available, the opportunity for determining a best setting for maximum selectivity while preserving sensitivity is enhanced.

In circumstances where increased sensitivity is required, tests have shown that wrapping two film transducers back to back (positive to negative) increases sensitivity by more than a simple factor of two. Additionally, by measuring only the difference between the two output signals, the effect of ambient noise is reduced.

It is understood that other modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

We claim:

1. A method of detecting unwanted fluid flow in a pipe to automatically trigger means for shutting off the flow, comprising:
   (a) attaching a piezoelectric transducer to the pipe to produce a first fluctuating electrical signal in response to pipe vibration:
   (b) amplifying the first fluctuating electrical signal to produce a second fluctuating electrical signal;
   (c) passing the second fluctuating electrical signal through a tunable low-pass filter to produce a third fluctuating electrical signal comprising a selectable portion of the frequency bandwidth of the second fluctuating electrical signal;
   (d) substantially averaging the total voltage changes of the third fluctuating electrical signal to produce a fourth electrical signal, wherein the frequency bandwidth of the third fluctuating electrical signal has been previously selected by:
      (i) causing a fluid flow in the pipe substantially equal to the flow that would occur in the event of a leaking pipe;
      (ii) measuring the level of the fourth electrical signal and tuning the tunable low-pass filter to produce the highest level of the fourth electrical signal; and,
      (iii) ceasing the fluid flow in the pipe;
   (e) measuring the length of time the fourth electrical signal is present and producing a fifth electrical signal when the fourth electrical signal is present for a preselected period of time; and,
   (f) detecting for the presence of a preselected level of the fifth electrical signal and, when detected, triggering the means for shutting off the flow.

2. A method of detecting unwanted fluid flow in a pipe to automatically trigger means for shutting off the flow, comprising:
   (a) attaching a piezoelectric transducer to the pipe to produce a first fluctuating electrical signal in response to pipe vibration;
   (b) amplifying the first fluctuating electrical signal to produce a second fluctuating electrical signal;
   (c) passing the second fluctuating electrical signal through a tunable low-pass filter to produce a third fluctuating electrical signal comprising a selectable portion of the frequency bandwidth of the second fluctuating electrical signal;
   (d) substantially averaging the total voltage changes of the third fluctuating electrical signal to produce a fourth electrical signal, wherein the frequency bandwidth of the third fluctuating electrical signal has been previously selected by:
      (i) alternatively starting and stopping a fluid flow in the pipe;
      (ii) measuring the level of the fourth electrical signal as the tunable low-pass filter is tuned across its range;
      (iii) selecting a tuned frequency bandwidth wherein the level of the fourth electrical signal is substantially zero when the flow is stopped, and above zero when the flow is started; and,
      (iii) ceasing the fluid flow in the pipe;
   (e) measuring the length of time the fourth electrical signal is present and producing a fifth electrical signal when the fourth electrical signal is present for a preselected period of time; and,
   (f) detecting for the presence of a preselected level of the fifth electrical signal and, when detected, triggering the means for shutting off the flow.

3. A method of detecting unwanted fluid flow in a pipe to automatically trigger means for shutting off the flow, comprising:
   (a) attaching a piezoelectric transducer to the pipe to produce a first fluctuating electrical signal in response to pipe vibration;
   (b) amplifying the first fluctuating electrical signal to produce a second fluctuating electrical signal;
   (c) passing the second fluctuating electrical signal through a tunable low-pass filter to produce a third fluctuating electrical signal comprising a selectable portion of the frequency bandwidth of the second fluctuating electrical signal;
   (d) substantially averaging the total voltage changes of the third fluctuating electrical signal to produce a fourth electrical signal, wherein the frequency bandwidth of the third fluctuating electrical signal has been previously selected by:
      (i) starting and stopping an externally caused vibration in the pipe;
      (ii) measuring the level of the fourth electrical signal as the tunable low-pass filter is tuned across its range;
      (iii) selecting a tuned frequency bandwidth wherein the level of the fourth electrical signal generally does not increase in response to the externally caused pipe vibration; and.
      (iii) ceasing the externally caused pipe vibration;
   (e) measuring the length of time the fourth electrical signal is present and producing a fifth electrical signal when the fourth electrical signal is present for a preselected period of time; and,
   (f) detecting for the presence of a preselected level of the fifth electrical signal and, when detected, triggering the means for shutting off the flow.

* * * * *